(12) United States Patent
Herud (10) Patent No.: US 11,548,077 B2
(45) Date of Patent: Jan. 10, 2023

(54) REDUCING SLEEVE, MODULAR SYSTEM FOR PROVIDING A REDUCING SLEEVE ASSEMBLY, AND MACHINING ASSEMBLY

(71) Applicant: Kennametal Inc., Latrobe, PA (US)

(72) Inventor: Josef K. Herud, Herzogenaurach (DE)

(73) Assignee: KENNAMETAL INC., Latrobe, PA (US)

(*) Notice: Subject to any disclaimer, the term of this patent is extended or adjusted under 35 U.S.C. 154(b) by 40 days.

(21) Appl. No.: 17/225,499

(22) Filed: Apr. 8, 2021

(65) Prior Publication Data
US 2021/0316377 A1    Oct. 14, 2021

(30) Foreign Application Priority Data

Apr. 8, 2020    (DE) .......................... 102020109775.1

(51) Int. Cl.
| | | |
|---|---|---|
| *B23B 31/20* | (2006.01) | |
| *B23B 31/30* | (2006.01) | |
| *B23B 51/12* | (2006.01) | |
| *B23B 31/10* | (2006.01) | |

(52) U.S. Cl.
CPC .......... *B23B 31/202* (2013.01); *B23B 31/305* (2013.01); *B23B 31/102* (2013.01); *B23B 51/12* (2013.01); *B23B 2231/24* (2013.01); *B23B 2250/12* (2013.01)

(58) Field of Classification Search
CPC ..... B23B 31/202; B23B 31/305; B23B 51/12; B23B 2250/12; B23B 2231/04; B23B 2231/24; B23B 2231/365; B23B 2260/026; B23B 2231/2091; B23Q 11/1023; Y10T 279/17111

See application file for complete search history.

(56) References Cited

U.S. PATENT DOCUMENTS

| | | |
|---|---|---|
| 5,028,178 A | 7/1991 | Ronen |
| 5,806,859 A | 9/1998 | Saccomanno, III |
| 7,186,064 B1 | 3/2007 | Erickson |
| 2002/0145260 A1 | 10/2002 | Komine |
| 2005/0044686 A1* | 3/2005 | Huijbers ............... B23B 31/305 409/232 |
| 2009/0241750 A1 | 10/2009 | Huang |

(Continued)

FOREIGN PATENT DOCUMENTS

| | | |
|---|---|---|
| CN | 106563831 A | 4/2017 |
| DE | 202011004231 U1 | 8/2011 |

(Continued)

*Primary Examiner* — Eric A. Gates
*Assistant Examiner* — Paul M Janeski
(74) *Attorney, Agent, or Firm* — Larry R. Meenan (57) ABSTRACT

A reducing sleeve for fastening a machining tool in a tool holder is described. Said reducing sleeve comprises a reducing sleeve body, which comprises a first tool-side end and a second tool holder-side end. In addition, at least one coolant supply channel is provided in the reducing sleeve body. Furthermore, a multifunctional interface is arranged at the second end and is designed for coupling to a sealing unit and a safety unit. Additionally presented is a modular system for providing a reducing sleeve assembly, which comprises such a reducing sleeve, a sealing unit, and a safety unit. In addition, a machining assembly with a tool holder, a reducing sleeve, and a machining tool is presented.

15 Claims, 6 Drawing Sheets

(56) References Cited

U.S. PATENT DOCUMENTS

| | | |
|---|---|---|
| 2012/0027532 A1 | 2/2012 | Cigni |
| 2013/0309035 A1 | 11/2013 | Guy |
| 2014/0054866 A1 | 2/2014 | Guy |
| 2014/0353931 A1 | 12/2014 | Frota De Souza Filho |
| 2015/0042050 A1 | 2/2015 | Haimer |
| 2015/0283627 A1 | 10/2015 | Borapura |
| 2016/0368064 A1 | 12/2016 | Boregowda |

FOREIGN PATENT DOCUMENTS

| | | | |
|---|---|---|---|
| DE | 202018105556 U1 | | 10/2018 |
| JP | H11114708 A | | 4/1999 |
| JP | 2005238386 A | | 9/2005 |
| KR | 101522867 B1 | * | 5/2015 |
| WO | WO2015102163 A1 | | 7/2015 |

* cited by examiner

REDUCING SLEEVE, MODULAR SYSTEM FOR PROVIDING A REDUCING SLEEVE ASSEMBLY, AND MACHINING ASSEMBLY

RELATED APPLICATION DATA

The present invention claims priority pursuant to 35 U.S.C. § 119(a) to German Patent Application Number 102020109775.1 filed Apr. 8, 2020 which is incorporated herein by reference in its entirety.

FIELD

The invention relates to a reducing sleeve for fastening a machining tool in a tool holder. The reducing sleeve comprises a reducing sleeve body which extends along a reducing sleeve center axis and which has a first end, which is a tool-side end in the clamped state of the reducing sleeve, and a second end, which is opposite to the first end and is a tool holder-side end in the clamped state of the reducing sleeve. In addition, the reducing sleeve body comprises at least one coolant supply channel extending at a distance from the reducing sleeve center axis.

The invention furthermore relates to a modular system for providing a reducing sleeve assembly.

The invention also relates to a machining assembly with a tool holder, a reducing sleeve of the aforementioned type arranged in the tool holder, and a machining tool with a tool shaft, which is accommodated in the interior of the reducing sleeve.

BACKGROUND

Such reducing sleeves and the machining assemblies equipped with them are known from the prior art. The tool holders can be hydraulically actuatable tool holders, which are also referred to as hydraulic tool holders in short.

A reducing sleeve usually serves to reliably hold a machining tool in an associated tool holder of a machining assembly. This is essentially done by clamping a tool shaft via the reducing sleeve in the tool holder. The reducing sleeve bridges the differences in diameter or thickness between the machining tool and the tool holder. In this connection, reducing sleeves can be designed according to numerous variants. Known are in particular reducing sleeves which have an additional pull-out safety geometry so that the tool shaft can be clamped in the tool holder on the one hand and on the other hand is secured via the pull-out safety geometry in a form-fitting manner against being pulled out of the reducing sleeve and/or the tool holder. Such reducing sleeves are also known under the term "safe lock" so that a safe lock mechanism or safe lock reducing sleeves are also often mentioned.

A coolant supply channel in the reducing sleeve body can be used to conduct coolant to a machining zone. For this purpose, it is not necessary that coolant supply channels are also provided on the machining tool itself. The reducing sleeve can therefore also serve to supply the coolant. Of course, reducing sleeves without coolant supply channels are also known in this connection. These sleeves can be used, for example, together with machining tools in which coolant supply channels are integrated.

In summary, numerous variants of reducing sleeves are known. Depending on the machining task to be performed, the most suitable one can be selected from these variants. However, this results in a certain amount of costs for storage, which has the goal of always being able to keep the appropriate reducing sleeve available for a certain spectrum of machining tasks.

This applies on the one hand to manufacturing environments in which the reducing sleeve and the machining tools held by means of it are used to produce other components. On the other hand, this also applies to a manufacturing environment in which reducing sleeves are produced in high variance. In both manufacturing environments, known reducing sleeves thus cause costs that result from the large number of variants mentioned and the associated storage.

SUMMARY

The object of the invention is to improve known reducing sleeves so that they can be produced cost-effectively and cause low costs when used to produce other components.

The object is achieved by a reducing sleeve of the type mentioned at the beginning, which at the second end has a multifunctional interface which is designed both for coupling the reducing sleeve body to a sealing unit for sealing the at least one coolant supply channel and for coupling the reducing sleeve body to a safety unit for providing a pull-out safety geometry for the machining tool. The reducing sleeve can thus be used universally in various applications.

The reducing sleeve can in particular be used without a sealing unit and without a safety unit. It can then serve to hold machining tools that do not have any coolant supply channels. A coolant supply of an associated machining zone then takes place via the coolant supply channels provided on the reducing sleeve. If the reducing sleeve is equipped with a safety unit, pull-out safety of the machining tool that goes beyond mere clamping can be provided. In the event that the reducing sleeve is equipped with a sealing unit, the coolant supply channels provided in the reducing sleeve are reliably sealed. Thus, either a machining task can be reliably fulfilled in dry processing or coolant can be introduced into such coolant supply channels that are provided on the machining tool.

The provision of such a reducing sleeve together with a sealing unit and a safety unit causes significantly reduced storage costs in comparison to known solutions because instead of various reducing sleeves, only a single reducing sleeve according to the invention must be kept available together with the safety unit and/or the sealing unit. The safety unit and the sealing unit act as adapters in the broadest sense. In addition, the reducing sleeve according to the invention can be a component of a modular system, which is explained below.

The reducing sleeve body of such a reducing sleeve is in particular a generatively manufactured component, which is also referred to as an additively manufactured component. It is preferably produced by means of a 3D printing method or an SLS method ("selective laser sintering"). Alternatively, the reducing sleeve body is produced conventionally, in particular using machining manufacturing methods.

In one variant, the reducing sleeve is provided at its tool-side end with a contact flange, via which it can be attached to an associated tool holder. This makes it possible to reliably and precisely position the reducing sleeve on the tool holder.

It is also possible for a slot to extend on the reducing sleeve body (substantially) in parallel to the reducing sleeve center axis. In this way, the elasticity of the reducing sleeve can be increased in the circumferential direction. This increases the reliability with which the reducing sleeve can clamp a machining tool.

The multifunctional interface basically ensures that several different functions (multifunctionality) can be covered by means of the interface by coupling corresponding components, e.g., the sealing unit or the safety unit, to the multifunctional interface.

The at least one coolant supply channel can at least in sections extend in the interior of the reducing sleeve body or at least in sections be designed as a groove that extends on an outer circumference of the reducing sleeve body. In the first case, the coolant supply channel is thus embedded at least in sections in the reducing sleeve body in such a way that it is circumferentially closed. In the second case, the coolant supply channel is radially open at least in sections and is completed, i.e., closed, by an associated wall of the tool holder. Both variants make it possible to reliably introduce coolant into a machining zone or to conduct it to the machining zone.

According to one embodiment, the interface comprises an internal thread, wherein the internal thread is designed to cooperate both with a counterpart of the sealing unit and with a counterpart of the safety unit. The internal thread is thus a core component of the multifunctional interface. It is designed to cooperate with a plurality of components acting as adapters, in particular with the safety unit and the sealing unit. This results in a wide range of possible uses of the reducing sleeve. In addition, the multifunctional interface can be used for adapters to be developed in the future.

The internal thread can act as a latching contour for the counterpart of the sealing unit. The internal thread thus has at least two functions. On the one hand, it acts as a thread and on the other hand as a latching contour. This results in a possible multifunctional use of the interface.

In principle, a reducing sleeve assembly can also be provided, which comprises a reducing sleeve of the aforementioned type as well as a sealing unit for sealing the at least one coolant supply channel of the reducing sleeve and/or a safety unit for providing a pull-out safety geometry for the machining tool.

In addition, the object is achieved by a modular system for providing a reducing sleeve assembly. This modular system comprises a reducing sleeve according to the invention, a sealing unit for sealing the at least one coolant supply channel of the reducing sleeve, and a safety unit for providing a pull-out safety geometry for the machining tool. The multifunctional interface of the reducing sleeve can be selectively coupled to the sealing unit or the safety unit. In comparison to the prior art, in which a plurality of different reducing sleeves must be provided, such a modular system causes significantly reduced storage costs with unchanged functional scope. As a result, only comparatively low manufacturing and provision costs are caused. This is in particular due to the fact that the safety unit and the sealing unit are significantly smaller than the reducing sleeve. In addition, the safety unit and the sealing unit are designed to cooperate with various reducing sleeves. This also reduces the storage costs and consequently the manufacturing and provision costs.

By means of such a modular system, a reducing sleeve assembly can thus be provided, which fulfills the same function as a known reducing sleeve without coolant supply channels, which can, for example, be used for machining tools which are equipped with coolant supply channels. In this case, the reducing sleeve according to the invention is provided with the sealing unit. In addition, a reducing sleeve assembly which has coolant supply channels can be provided by means of the modular system. This reducing sleeve assembly can cooperate with machining tools that do not have their own coolant supply channels. In this case, the reducing sleeve according to the invention is equipped neither with the sealing unit nor with the safety unit. Moreover, a reducing sleeve assembly which is provided with a pull-out safety geometry (safe lock) can be provided by means of the modular system. This reducing sleeve assembly can be used with such machining tools that have a corresponding counter geometry for the pull-out safety geometry. In this application, the reducing sleeve according to the invention is equipped with the safety unit.

In this connection, the sealing unit is preferably a plastic part. The sealing unit is designed as an injection-molded part, for example.

The safety unit can be designed as a generatively/additively manufactured component. The safety unit is then preferably produced by means of a 3D printing method or an SLS method.

According to one variant, the safety unit is coupled to the reducing sleeve body via the multifunctional interface. In this case, a first external thread of the safety unit is in particular screwed into the internal thread of the interface. The safety unit is a separate component from the reducing sleeve body. It is reliably connected to the reducing sleeve body via the external thread and the internal thread. The external thread represents a counterpart for the internal thread of the multifunctional interface. The designation of the external thread first serves only as a simple explanation. This does not imply a number of external threads. Such a reducing sleeve assembly can therefore provide an additional pull-out safety of a machining tool (safe lock) in addition to the usual clamping.

The safety unit can have a central opening to the coolant supply. It can thus also be used in connection with machining tools which have their own coolant supply channels.

In this connection, the safety unit preferably has a pull-out safety geometry, which is designed to form, with a machining tool, a form fit which acts along the reducing sleeve center axis and prevents the machining tool from being pulled out of the reducing sleeve. In this case, the pull-out safety geometry is in particular located radially within the first external thread. The pull-out safety geometry preferably extends spirally on an inner circumference of the safety unit. According to one embodiment, the pull-out safety geometry thus represents a threaded section into which the machining tool, more precisely an associated tool shaft, can be screwed.

The safety unit can comprise a second external thread, which serves to fasten a composite of the safety unit and of the reducing sleeve to the tool holder. The second external thread is preferably arranged axially adjacent to the first external thread, in particular in relation to the reducing sleeve center axis. The diameter of the first external thread further preferably differs from the diameter of the second external thread. In particular, the diameter of the second external thread is smaller than the diameter of the first external thread. The safety unit can thus be mounted only in a single position on the reducing sleeve. Incorrect assembly is therefore reliably excluded ("poka-yoke" principle). The machining tool can also be held particularly reliably on the tool holder in this way.

Alternatively, the sealing unit is coupled via the multifunctional interface to the reducing sleeve body. In particular, a latching contour of the sealing unit is latched to the internal thread of the interface. The latching contour of the sealing unit represents a counterpart for the internal thread of the multifunctional interface. The sealing unit is also a separate component from the reducing sleeve body. As already explained in connection with the safety unit, the sealing unit can also have a central opening to the coolant supply. Machining tools that themselves have coolant supply channels can then also be used in combination with the sealing unit.

The sealing unit advantageously comprises a substantially (circular) cylindrical latching section, the center axis of which substantially coincides with the reducing sleeve center axis in the assembled state of the sealing unit, wherein the latching contour of the sealing unit is arranged on an outer circumference of the latching section. In this way, the sealing unit can be reliably latched to the reducing sleeve.

Alternatively or additionally, the sealing unit comprises a sealing section for the fluid-tight sealing of the at least one coolant supply channel. In the assembled state of the sealing unit, the sealing section in particular seals the at least one coolant supply channel in the axial direction. The coolant supply channel or channels of the reducing sleeve is or are thus reliably sealed. Overall, a simple design of the sealing unit results so that it can be produced easily and cost-effectively.

The sealing unit is preferably made of a plastic. On the one hand, this results in advantageous sealing properties. On the other hand, such a sealing unit can be produced easily and cost-effectively, in particular in high quantities.

In addition, the object is achieved by a machining assembly of the type mentioned at the beginning, in whose tool holder a reducing sleeve according to the invention is arranged. The tool shaft is accommodated in the interior of the reducing sleeve according to the invention. The coolant supply channel in the reducing sleeve is optionally coupled in a fluid-conducting manner to an associated coolant supply channel in the tool holder so that a machining zone can be supplied with coolant.

The reducing sleeve can be equipped with a safety unit, wherein the machining tool is coupled to the safety unit via a form fit which acts along the reducing sleeve center axis and counteracts any pulling of the machining tool out of the reducing sleeve. In this case, the reducing sleeve is in particular additionally axially fastened via the safety unit in the tool holder. This results in a particularly reliable hold of the machining tool in the tool holder.

Alternatively, the reducing sleeve can be equipped with a sealing unit, by means of which all coolant supply channels provided on the reducing sleeve are sealed. Then, either a coolant supply channel in the machining tool can be supplied with coolant via the tool holder or a coolant supply can be dispensed with so that dry processing is possible.

BRIEF DESCRIPTION OF THE DRAWINGS

The invention is explained below with reference to various exemplary embodiments that are shown in the accompanying drawings. The drawings show.

DETAILED DESCRIPTION

Figure 1:
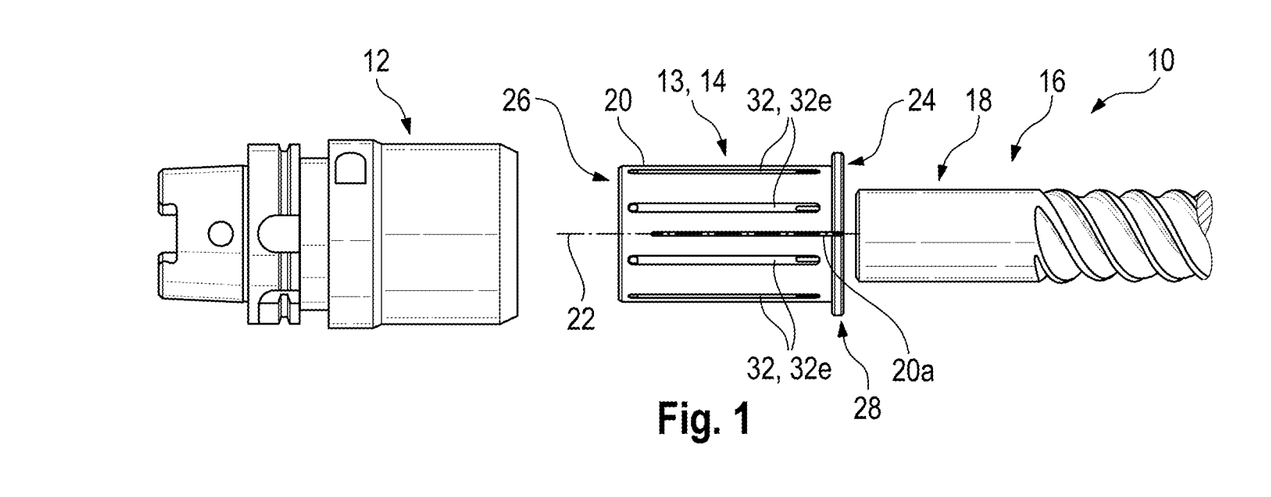
FIG. 1 an exploded view of a machining assembly according to the invention according to a first embodiment with a reducing sleeve assembly provided by a modular system according to the invention and comprising a reducing sleeve according to the invention, FIG. 2 an illustration, corresponding to FIG. 1, of the machining assembly according to the first embodiment, wherein the reducing sleeve assembly is shown in a sectional view, FIG. 3 a perspective illustration of a reducing sleeve designed according to one variant, FIG. 4 another perspective illustration of the reducing sleeve of FIG. 3, FIG. 5 a side view of the reducing sleeve of FIGS. 3 and 4, FIG. 6 a sectional view of the reducing sleeve of FIG. 5 along the line VI-VI, FIG. 7 an exploded view of a machining assembly according to the invention according to a second embodiment with a reducing sleeve assembly provided by a modular system according to the invention and comprising a reducing sleeve according to the invention, FIG. 8 an illustration, corresponding to FIG. 7, of the machining assembly according to the second embodiment, wherein the reducing sleeve assembly is assembled and shown in a sectional view, FIG. 9 an exploded view of a machining assembly according to the invention according to a third embodiment with a reducing sleeve assembly provided by a modular system according to the invention and comprising a reducing sleeve according to the invention, FIG. 10 an illustration, corresponding to FIG. 9, of the machining assembly according to the third embodiment, wherein the reducing sleeve assembly is assembled and shown in a sectional view, FIG. 11 an isolated, perspective illustration of a sealing unit of the machining assembly according to the invention of FIGS. 7 and 8, FIG. 12 an isolated, perspective illustration of a safety unit of the machining assembly according to the invention of FIGS. 9 and 10, and FIG. 13 the safety unit of FIG. 12 from a different perspective.
Figure 2:
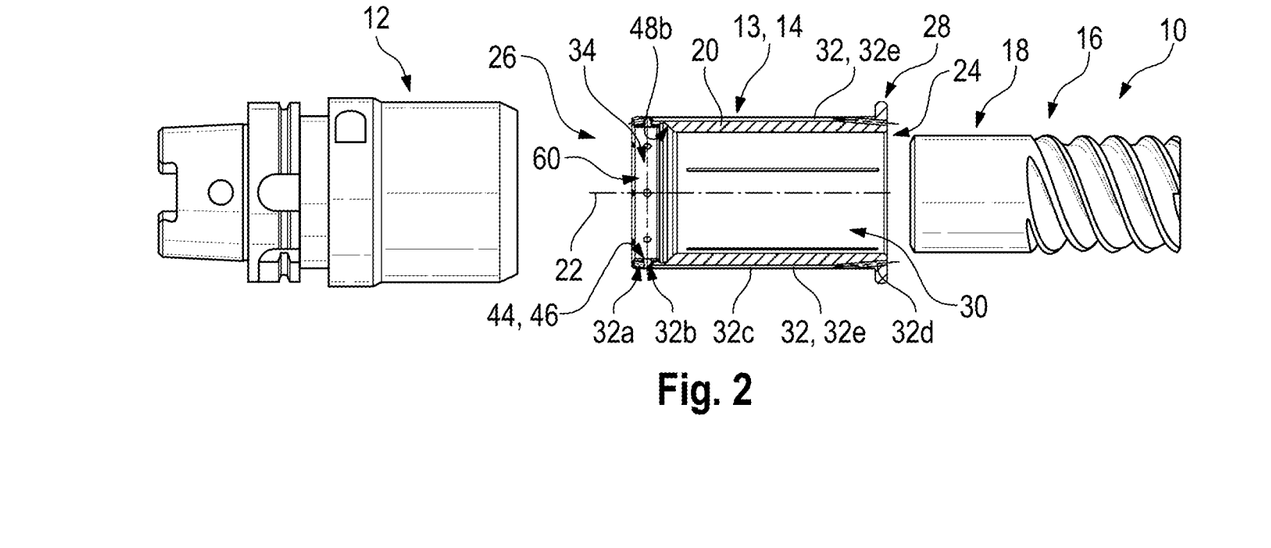
Figure 3:
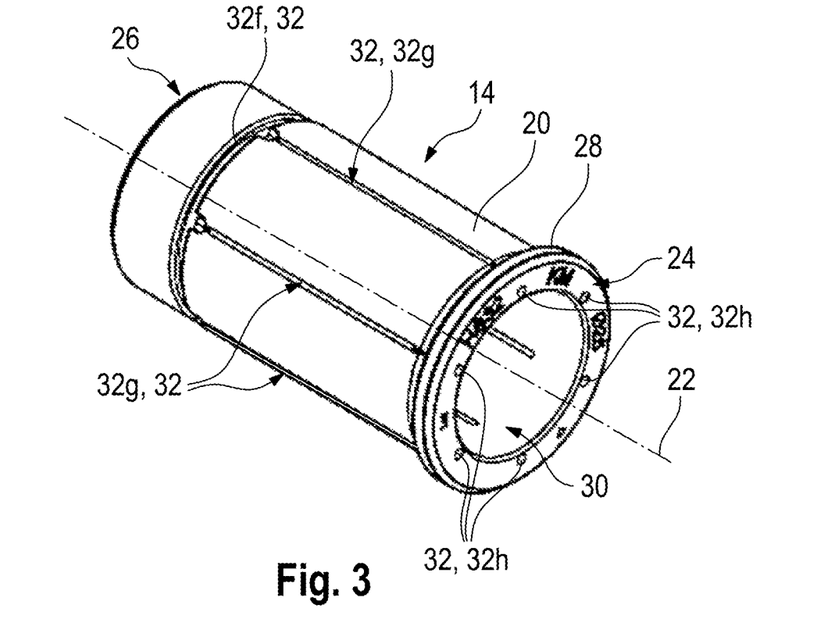
Figure 4:
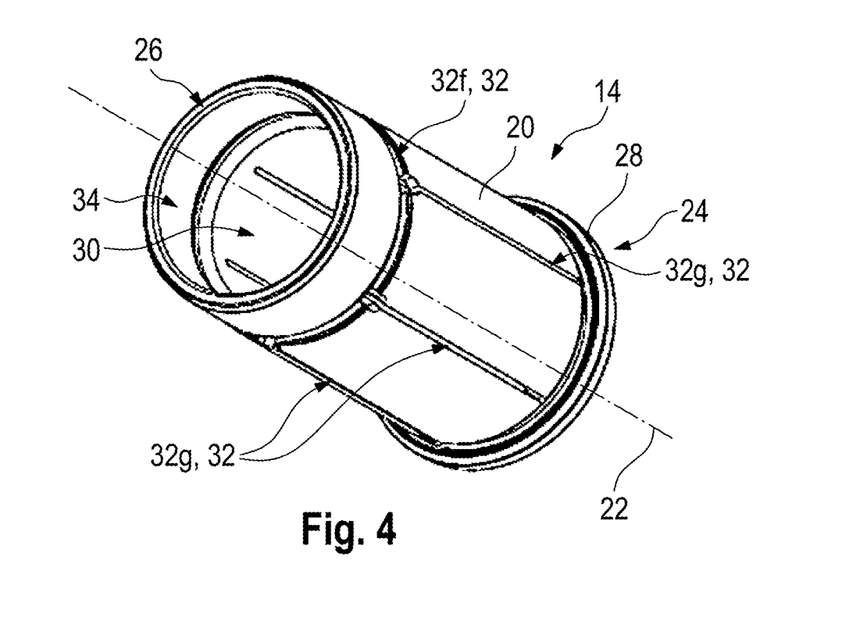
Figure 5:
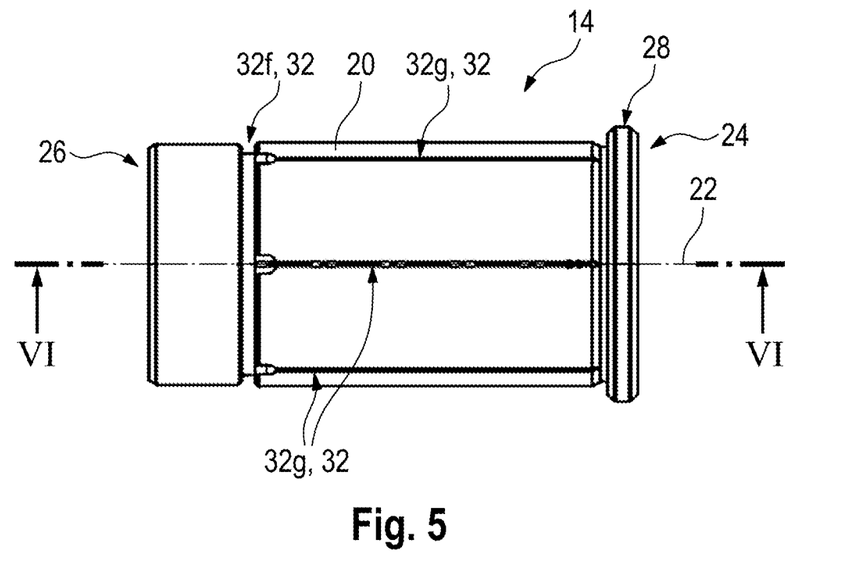

FIGS. 1 and 2 show a machining assembly 10 according to a first embodiment.

It comprises a tool holder 12, which is designed as a hydraulic tool holder.

The machining assembly 10 furthermore has a reducing sleeve assembly 13 with a reducing sleeve 14, which is arranged in the tool holder 12 in the assembled state.

In addition, the machining assembly 10 comprises a machining tool 16 having a tool shaft 18. In the assembled state, the tool shaft 18 is accommodated in the interior of the reducing sleeve 14.

The reducing sleeve 14 thus serves to fasten the machining tool 16 in the tool holder 12.

For this purpose, it comprises a reducing sleeve body 20, which extends along a reducing sleeve center axis 22.

Said reducing sleeve body has a first end 24 and a second end 26, which is opposite to the first end 24. In this case, in the clamped state of the reducing sleeve 14, the first end 24 is a tool-side end, via which the machining tool 16 is inserted into the reducing sleeve 14, and the second end 26 is a tool holder-side end, via which the reducing sleeve 14 is inserted into the tool holder 12.

At the first end 24, the reducing sleeve 14 additionally has a contact flange 28, which abuts against the tool holder 12 in the assembled state axially, i.e., in relation to the reducing sleeve center axis 22.

The reducing sleeve body 20 also has at least one optional, substantially axially extending slot 20a, which serves to increase the circumferential elasticity.

A holding region 30 for the tool shaft 18 is moreover formed in the interior of the reducing sleeve body 20. In the assembled state, the tool shaft 18 is clamped in the holding region 30 by means of the hydraulic tool holder 12.

Furthermore, the reducing sleeve body 20 has a plurality of coolant supply channels 32, each of which is composed of a first bore section 32a, which extends substantially in parallel to the reducing sleeve center axis 22, a second bore section 32b, which extends substantially radially with respect to the reducing sleeve center axis 22, a groove section 32c, and a third bore section 32d.

Since the groove section 32c is by far the largest section of the coolant supply channel 32, the coolant supply channel 32 can simply also be referred to as groove 32e.

The at least one groove 32e can be formed on the outside of the reducing sleeve body 20 so that the at least one coolant supply channel 32 is open to the radial outside. When inserting the reducing sleeve 14 into the tool holder 12, the corresponding groove 32e is closed by the inner side of the tool holder 12 so that the at least one (circumferentially closed) coolant supply channel 32 forms.

Alternatively, the at least one coolant supply channel 32 can be embedded in the reducing sleeve body 20. In this respect, the respective coolant supply channel 32 can already be closed circumferentially.

A machining zone that is not shown in greater detail can be supplied with coolant by means of the coolant supply channels 32.

The coolant supply channels 32 all extend at a distance from the reducing sleeve center axis 22, i.e., radially to the reducing sleeve center axis 22. Furthermore, the coolant supply channels 32 extend substantially axially, i.e., in parallel to the reducing sleeve center axis 22.

In this connection, the machining tool 16 is designed without its own coolant supply channels.

In addition, the reducing sleeve 14 is equipped with a multifunctional interface 34, which is explained in more detail in connection with the following embodiments.

FIGS. 3 to 6 show a variant of the reducing sleeve 14. Only the differences to the reducing sleeve according to FIGS. 1 and 2 are discussed below.

The reducing sleeve 14 according to the variant differs from the previously explained reducing sleeve 14 by the shape of the coolant supply channels 32.

A circumferential coolant supply groove 32f is provided on the outer circumference of the reducing sleeve body 20. Coolants can be introduced into said coolant supply groove via coolant supply channels (not shown in greater detail) of the associated tool holder 12.

Several coolant supply slots 32g extend from the coolant supply groove 32f along the reducing sleeve center axis 22. Said coolant supply slots are continuous in the radial direction on the reducing sleeve body 20 and are sealed radially on the inside by inserting a tool shaft 18 into the reducing sleeve body 20 and radially on the outside by inserting the reducing sleeve 14 into the tool holder 12.

In the region of the first end 24, each coolant supply groove 32f is adjoined by a bore section 32h which extends substantially in parallel to the reducing sleeve center axis 22 and via which coolant can be introduced into a machining zone not shown in greater detail.

Figure 6:
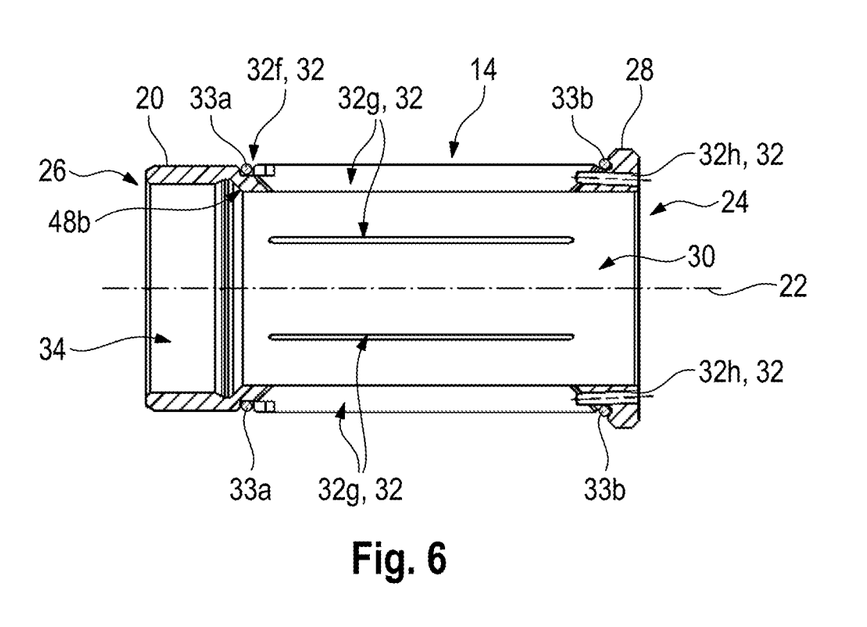

In the event that the coolant supply channels 32 of the reducing sleeve 14 are not to be used for coolant supply, a sealing element, e.g., an O-ring 33a, can be inserted into the coolant supply groove 32f so that the coolant supply slots 32g are sealed in a fluid-tight manner with respect to a coolant supply on the tool holder side (see FIG. 6).

In this connection, a machining tool 16 having its own cooling channels can be accommodated in the reducing sleeve 14, for example.

In addition, independently of the use of the coolant supply channels 32, an O-ring 33b can be provided, which is located in a sealing manner between the contact flange 28 and the tool holder 12 in the assembled state of the reducing sleeve. The O-ring 33b ensures that coolant exits exclusively via the provided coolant supply channels 32 and not somewhat via any intermediate space formed between the reducing sleeve 14 and the tool holder 12.

It goes without saying that the O-ring 33b can also be used in the reducing sleeve 14 of FIGS. 1 and 2.

Figure 7:
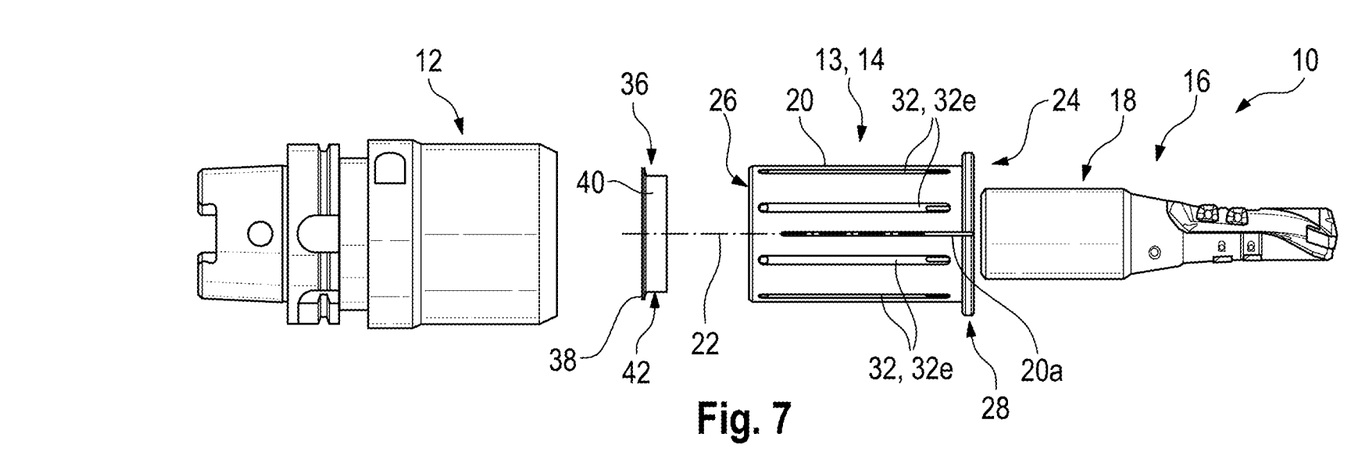
Figure 8:
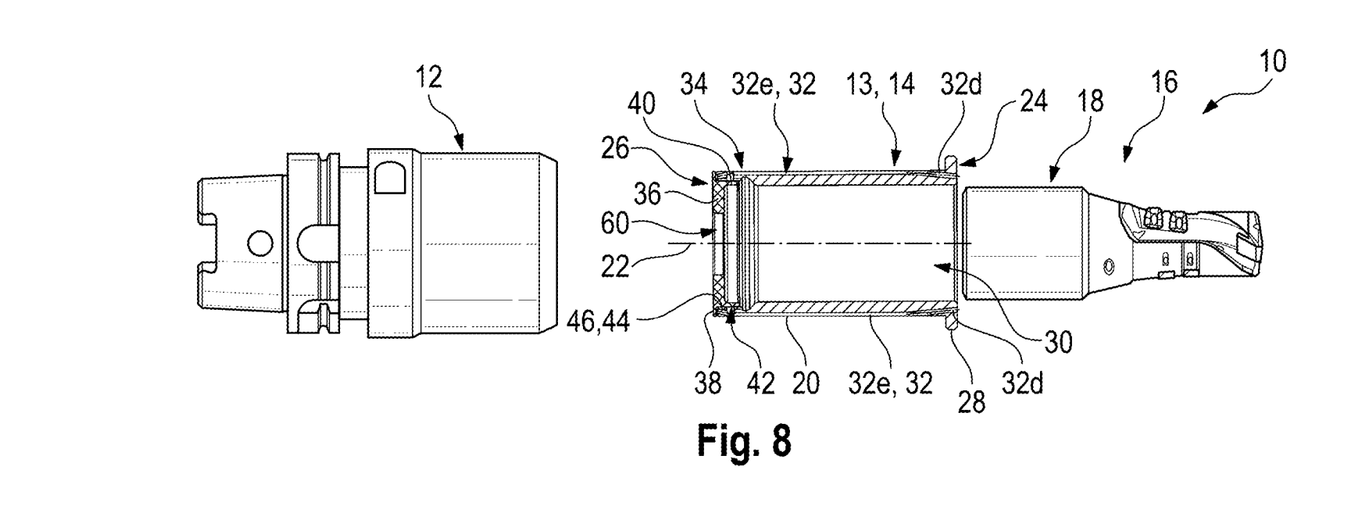

FIGS. 7 and 8 show a machining assembly 10 according to a second embodiment. Only the differences to the first embodiment are discussed below. As for the rest, reference is made to the explanations above.

The reducing sleeve 14 is now equipped with a sealing unit 36, by means of which all coolant supply channels 32 provided on the reducing sleeve 14 are sealed.

The sealing unit 36 has a sealing section 38 for the fluid-tight sealing of the coolant supply channels 32. In the assembled state of the sealing unit 36, said sealing section in particular seals the coolant supply channels 32 in the axial direction, i.e., along the reducing sleeve center axis 22.

In addition, the sealing unit 36 has a substantially cylindrical latching section 40.

In the assembled state of the sealing unit 36, a center axis of the latching section 40 substantially coincides with the reducing sleeve center axis 22.

On an outer circumference of the latching section 40, a latching contour 42 can also be provided, which is formed by a knurling or corrugation in the embodiment shown.

The sealing unit 36 is preferably made of a plastic.

The sealing unit 36 is coupled via the multifunctional interface 34 to the reducing sleeve body 20.

For this purpose, the interface 34 comprises an internal thread 44 (see also FIG. 2), which is designed to cooperate with the latching section 40 of the sealing unit 36, which acts as a counterpart for this purpose.

The internal thread 44 thus simultaneously represents a latching contour 46 of the reducing sleeve 14.

In other words, the sealing unit 36 is latched to the reducing sleeve body 20.

Figure 11:
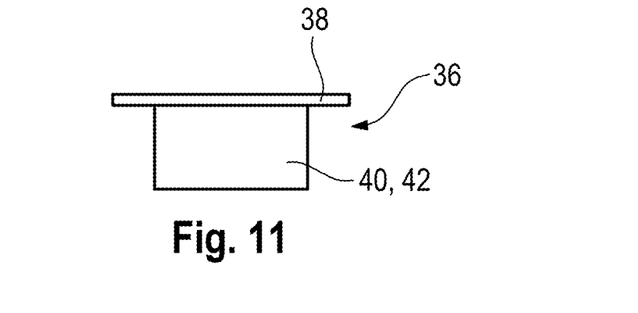

The sealing unit 36 can be seen in detail in FIG. 11.

Figure 9:
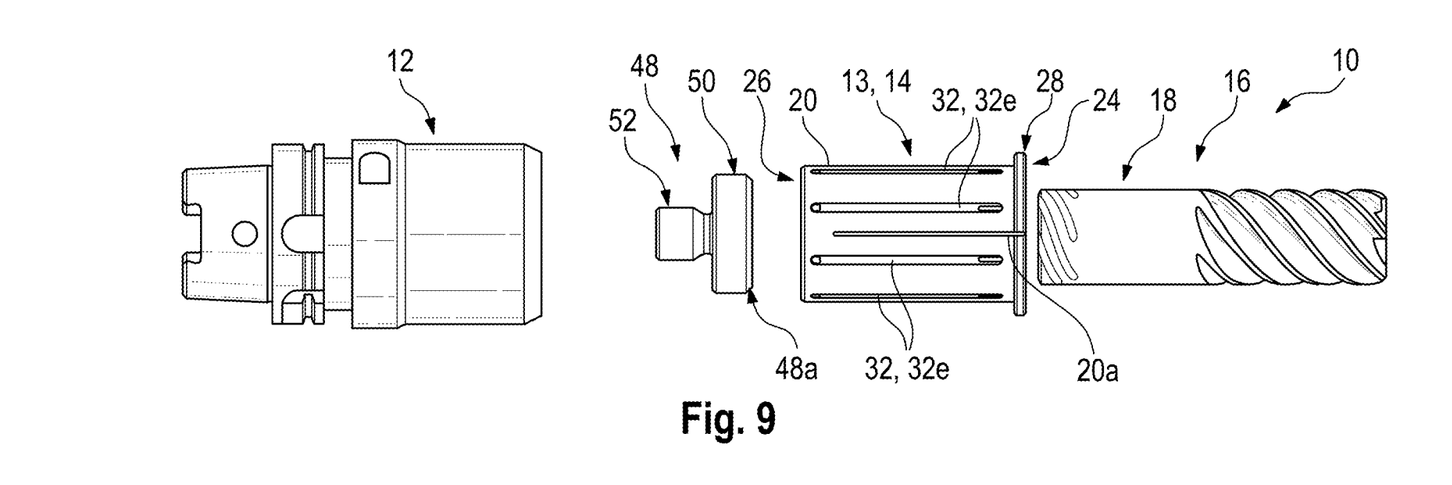
Figure 10:
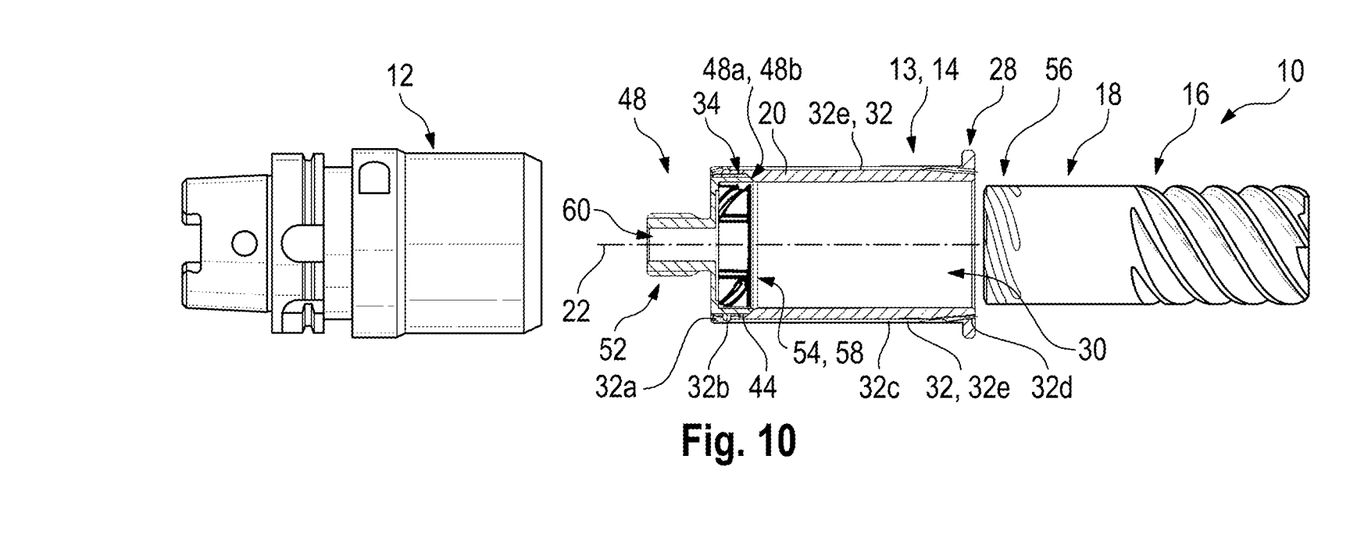

FIGS. 9 and 10 show a machining assembly 10 according to a third embodiment. Only the differences to the already explained embodiments are again discussed. As for the rest, reference is made to the explanations above.

Instead of the sealing unit 36, a safety unit 48 is now coupled via the multifunctional interface 34 to the reducing sleeve body 20.

In this connection, the safety unit 48 comprises a first external thread 50, which is screwed into the internal thread 44 of the interface in the assembled state. The safety unit 48 is thereby fixedly connected to the reducing sleeve body 20. In particular, this applies along the reducing sleeve center axis 22.

At an axial end of the safety unit 48, which faces the holding region 30 in the assembled state, a chamfer 48a is also provided, the chamfer surface of which corresponds to a conical lateral surface section.

In the assembled state of the safety unit 48, the chamfer 48a abuts against a stop surface 48b, which is formed on the reducing sleeve body 20 (see also FIGS. 2 and 6). The stop surface 48b is also designed as a conical lateral surface section so that the chamfer 48a can abut flat against it.

This results in a precise alignment of the safety unit 48 with respect to the reducing sleeve 14. This relates in particular to the coaxiality of a center axis of the safety unit 48 and the reducing sleeve center axis 22. This results in a high concentricity of a reducing sleeve assembly formed in this way.

In addition, the safety unit 48 is provided with a second external thread 52, by means of which the reducing sleeve 14 can be fastened to the tool holder 12. The reducing sleeve 14 can thus be screwed into the tool holder 12 via the safety unit 48 so that it is secured against being pulled out of the tool holder 12 along the reducing sleeve center axis 22.

The safety unit 48 also has a pull-out safety geometry 54, which is designed to form with the machining tool 16 a form fit acting along the reducing sleeve center axis 22.

For this purpose, the pull-out safety geometry 54 engages in an associated counter geometry 56, which is provided on the tool shaft 18.

In the embodiment shown, the pull-out safety geometry 54 is formed by a threaded section 58, which comprises several bulges or ribs which extend spirally on an inner circumference of the safety unit 48 and form the threaded section 58.

Accordingly, the counter geometry 56 is formed from several grooves which extend spirally on the circumference of the tool shaft 18 and in which the bulges or ribs of the threaded section 58 engage.

The machining tool 16 can therefore be screwed to the safety unit 48 via the pull-out safety geometry 54 and the counter geometry 56 in order to secure it in a form-fitting manner against being pulled out of the reducing sleeve 14.

In the embodiment shown, the pull-out safety geometry 54 is arranged radially within the first external thread 50.

Figure 12:
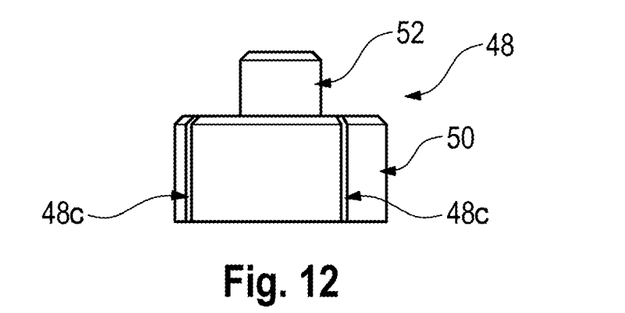
Figure 13:
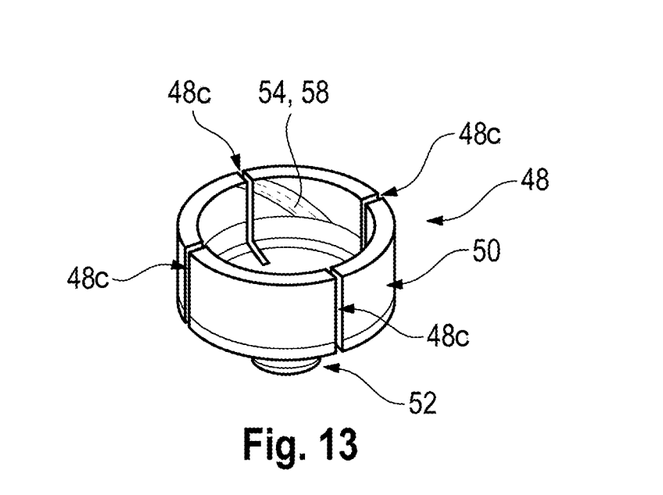

A detailed view of the safety unit 48 can be found in FIGS. 12 and 13.

It can also be seen there that the safety unit 48 has a total of four optional axial slots 48c.

In summary, the reducing sleeve 14, the sealing unit 36, and the safety unit 48 form a modular system for providing the reducing sleeve assembly 13.

The sealing unit 36 or the safety unit 48 or neither of the two is selectively coupled to the reducing sleeve 14 via the multifunctional interface 34. Consequently, depending on the machining tool 16 to be used, an appropriate reducing sleeve assembly 13 can always be provided.

Furthermore, the reducing sleeve assembly 13 always provides a central coolant supply channel 60 across all of the embodiments described above. Said coolant supply channel can be used to supply coolant to machining tools 16 which have coolant supply channels.

In the event that the reducing sleeve 14 is used solely for fastening the machining tool 16, the central coolant supply channel 60 is formed by an axially open second end 26.

In the event that the sealing unit 36 is used, the central coolant supply channel is realized by an opening which extends substantially axially and is arranged centrally. The same applies in connection with the safety unit 48.

The invention claimed is:

1. A reducing sleeve for fastening a machining tool in a tool holder, comprising:
a reducing sleeve body which extends along a reducing sleeve center axis and which has a first end, which is a tool-side end in the clamped state of the reducing sleeve, and a second end, which is opposite to the first end and is a tool holder-side end in the clamped state of the reducing sleeve,
wherein the reducing sleeve body comprises at least one coolant supply channel which extends at a distance from the reducing sleeve center axis,
wherein at the second end is provided a multifunctional interface comprising an internal thread, which is designed for coupling the reducing sleeve body to a sealing unit for sealing the at least one coolant supply channel and, instead of the sealing unit, for coupling the reducing sleeve body to a safety unit for providing a pull-out safety geometry for the machining tool.

2. The reducing sleeve according to claim 1, wherein the at least one coolant supply channel extends at least in sections in the interior of the reducing sleeve body or is designed at least in sections as a groove that extends on an outer circumference of the reducing sleeve body.

3. The reducing sleeve according to claim 1, wherein the internal thread is designed to cooperate with a latching section of the sealing unit and external threads of the safety unit.

4. The reducing sleeve according to claim 3, wherein the internal thread serves as a latching contour for the latching section of the sealing unit.

5. A modular system for providing a reducing sleeve assembly, comprising: a reducing sleeve according to claim 1,
a sealing unit for sealing the at least one coolant supply channel of the reducing sleeve, and
a safety unit for providing a pull-out safety geometry for the machining tool,
wherein the multifunctional interface of the reducing sleeve can selectively be coupled to the sealing unit or the safety unit.

6. The modular system according to claim 5, wherein the safety unit is coupled to the reducing sleeve body via the multifunctional interface, wherein a first external thread of the safety unit is in particular screwed into the internal thread of the interface.

7. The modular system according to claim 5, wherein the safety unit has a pull-out safety geometry, which is designed to form with a machining tool a form fit which acts along the reducing sleeve center axis and counteracts any pulling of the machining tool out of the reducing sleeve.

8. The modular system according to claim 5, wherein the safety unit comprises a second external thread, which serves to fasten a composite of the safety unit and of the reducing sleeve to the tool holder.

9. The modular system according to claim 5, wherein the sealing unit is coupled to the reducing sleeve body via the multifunctional interface, wherein a latching contour of the sealing unit is latched to the internal thread of the interface.

10. The modular system according to claim 9, wherein the sealing unit has a substantially cylindrical latching section, the center axis of which substantially coincides with the reducing sleeve center axis in the assembled state of the sealing unit, wherein the latching contour of the sealing unit is arranged on an outer circumference of the latching section.

11. The modular system according to claim 9, wherein the sealing unit has a sealing section for the fluid-tight sealing of the at least one coolant supply channel, wherein the sealing section in particular seals the coolant supply channel in the axial direction in the assembled state of the sealing unit.

12. The modular system according to claim 9, wherein the sealing unit is made of a plastic material.

13. A machining assembly comprising a tool holder, a reducing sleeve according to claim 1 arranged in the tool holder, and a machining tool with a tool shaft, which is accommodated in the interior of the reducing sleeve.

14. The machining assembly according to claim 13, wherein the reducing sleeve is equipped with a safety unit, and wherein the machining tool is coupled to the safety unit via a form fit which acts along the reducing sleeve center axis and counteracts any pulling of the machining tool out of the reducing sleeve.

15. The machining assembly according to claim 13, wherein the reducing sleeve is equipped with a sealing unit, by means of which all coolant supply channels provided on the reducing sleeve are sealed.

* * * * *